(12) United States Patent
Lutz

(10) Patent No.: US 12,215,731 B2
(45) Date of Patent: Feb. 4, 2025

(54) SANDWICH PLATE ELEMENT CONNECTION SYSTEM AND METHOD FOR CONNECTING SANDWICH PLATE ELEMENTS

(71) Applicant: Luvly AB, Nyköping (SE)

(72) Inventor: Håkan Glanton Lutz, Nyköping (SE)

(73) Assignee: LUVLY AB, Nykoping (SE)

( * ) Notice: Subject to any disclaimer, the term of this patent is extended or adjusted under 35 U.S.C. 154(b) by 259 days.

(21) Appl. No.: 17/504,090

(22) Filed: Oct. 18, 2021

(65) Prior Publication Data

US 2023/0124611 A1    Apr. 20, 2023

(30) Foreign Application Priority Data

Oct. 15, 2021    (EP) ..................................... 21202797

(51) Int. Cl.
 *F16B 5/01*         (2006.01)
 *F16B 5/06*         (2006.01)
 *B62D 27/02*        (2006.01)

(52) U.S. Cl.
 CPC .............. *F16B 5/01* (2013.01); *F16B 5/0614* (2013.01); *B62D 27/026* (2013.01)

(58) Field of Classification Search
 CPC .............. A47B 47/0033; B62D 27/026; B62D 33/046; E04B 1/6112; E04B 2001/6195;

(Continued)

(56) References Cited

U.S. PATENT DOCUMENTS 3,380,768 A * 4/1968 Wolfensberger ........ F16B 12/02
                                                    403/205
3,688,460 A *  9/1972 Johannes .............. E04F 19/065
                                                    52/471

(Continued)

FOREIGN PATENT DOCUMENTS

DE          2109871 A1 *  9/1972 ............ E04B 1/6112
DE          3013413 A1 * 10/1981 .............. F16B 12/02

(Continued)

OTHER PUBLICATIONS

E-spacenet English Abstract of DE 102012213469.

(Continued)

*Primary Examiner* — Josh Skroupa
(74) *Attorney, Agent, or Firm* — Kagan Binder, PLLC

(57) ABSTRACT

A sandwich plate element connection system (1, 2, 3, 4, 5), comprising two sandwich plate elements (100) and a connection element (200, 400, 500, 600, 700) connecting said two sandwich plate elements (100) by means of an adhesive joint (250) and defining two recesses (210, 220, 410, 420, 510, 520, 530, 610, 620, 630, 640). The connection element (200, 400, 500, 600, 700) comprises a first part (200:1, 400:1, 500:1, 600:1, 700:1) and a second part (200:2, 400:2, 500:2, 600:2, 700:2) connected to each other by a snap fit joint (270, 470, 570, 670, 770), for formation of at least one of said two recesses (210, 220, 410, 420, 510, 520, 530, 610, 620, 630, 640). The adhesive joint (250) comprises an adhesive (260). A chassis (10) for a vehicle comprising a sandwich plate element connection system (1, 2, 3, 4, 5) and a method (20) for connecting two sandwich plate elements (100) are also provided.

13 Claims, 9 Drawing Sheets

(58) Field of Classification Search
CPC ....... E04F 19/06; E04F 19/061; E04F 19/064;
E04F 19/065; F16B 5/01; F16B 5/0614;
F16B 5/0692; F16B 12/02; F16B 12/46;
F16B 12/50; Y10S 403/10; Y10T 403/34;
Y10T 403/341; Y10T 403/42; Y10T
403/7096; Y10T 403/73
USPC ......... 403/169, 170, 205, 382, 403, DIG. 10
See application file for complete search history.

(56) References Cited

U.S. PATENT DOCUMENTS

| | | | | |
|---|---|---|---|---|
| 4,258,519 | A | * 3/1981 | Hugens | ............... E04B 1/6112 |
| | | | | 52/282.1 |
| 5,042,395 | A | 8/1991 | Wackerle et al. | |
| 5,320,403 | A | 6/1994 | Kazyak | |
| 6,237,989 | B1 | 5/2001 | Ammerlaan et al. | |
| D690,436 | S | * 9/2013 | Elizarraras | ..................... D25/55 |
| D700,360 | S | * 2/2014 | Elizarraras | ..................... D25/55 |
| 8,776,376 | B2 | * 7/2014 | Williams | ............. E04F 19/064 |
| | | | | 403/403 |
| 9,567,013 | B2 | 2/2017 | Ehrlich et al. | |
| D814,059 | S | * 3/2018 | Singh | ........................... D25/119 |
| D847,380 | S | * 4/2019 | Singh | ........................... D25/119 |
| D849,270 | S | * 5/2019 | Singh | ........................... D25/119 |
| D924,438 | S | * 7/2021 | Zabala | ........................ D25/123 |
| 11,161,548 | B2 | 11/2021 | Lutz | |
| 2008/0044630 | A1 | 2/2008 | Lusk et al. | |
| 2009/0139167 | A1 | * 6/2009 | Donaldson | ............. F16B 12/46 |
| | | | | 403/23 |
| 2013/0313862 | A1 | 11/2013 | Yamaji et al. | |
| 2015/0158532 | A1 | 6/2015 | Ayuzawa et al. | |
| 2017/0021871 | A1 | 1/2017 | Kumar et al. | |
| 2017/0240215 | A1 | 8/2017 | LaRose et al. | |
| 2018/0118265 | A1 | 5/2018 | Gallier | |
| 2019/0283810 | A1 | 9/2019 | Nothdurfter et al. | |
| 2019/0329823 | A1 | 10/2019 | Lutz | |
| 2020/0039586 | A1 | 2/2020 | Ayuzawa | |
| 2020/0108876 | A1 | 4/2020 | Wang | |

FOREIGN PATENT DOCUMENTS

| | | | | |
|---|---|---|---|---|
| DE | 102007035772 | A1 | 2/2009 | |
| DE | 102012213469 | B3 | 11/2013 | |
| DE | 102013105987 | A1 | 12/2013 | |
| DE | 202016003447 | U1 | 8/2016 | |
| DE | 102020107723 | A1 * | 9/2021 | ............. F16B 12/02 |
| EP | 0523831 | A1 | 1/1993 | |
| EP | 2327609 | A2 | 6/2011 | |
| EP | 2592198 | A2 * | 5/2013 | ............. E04F 19/061 |
| EP | 3109123 | A1 | 12/2016 | |
| EP | 3538423 | B1 | 3/2021 | |
| FR | 1483536 | A * | 6/1967 | ............. E04F 19/064 |
| GB | 913888 | A * | 12/1962 | ............. F16B 12/02 |
| GB | 2425785 | A * | 11/2006 | ............. E04F 19/062 |
| GB | 2484073 | A * | 4/2012 | ............. E04F 19/064 |
| NL | 9101095 | A * | 1/1993 | ............. F16B 12/02 |
| WO | 03/045767 | A1 | 6/2003 | |
| WO | 2011029451 | A1 | 3/2011 | |
| WO | 2016156746 | A1 | 10/2016 | |

OTHER PUBLICATIONS

E-spacenet English Abstract of DE 102013105987.
E-spacenet English Abstract of DE 202016003447.
E-spacenet English Abstract of EP 3109123.
E-spacenet English Abstract of WO 2016156746.
E-spacenet English Abstract of WO 03/045767.
International Search Report for International Application No. pct/EP2022/078346, mailed Jan. 25, 2023, (4 pages).

* cited by examiner

SANDWICH PLATE ELEMENT CONNECTION SYSTEM AND METHOD FOR CONNECTING SANDWICH PLATE ELEMENTS

CROSS-REFERENCE TO RELATED APPLICATIONS

This application claims priority to European Application No. 21202797.3, filed Oct. 15, 2021 and titled "SANDWICH PLATE ELEMENT CONNECTION SYSTEM AND METHOD FOR CONNECTING SANDWICH PLATE ELEMENTS," the disclosure of which is incorporated herein by reference in its entirety.

FIELD OF INVENTION

The present disclosure generally relates to a sandwich plate element connection system, a chassis for a vehicle comprising a sandwich plate element connection system and a method for connecting two sandwich plate elements by means of a connection element.

BACKGROUND OF THE INVENTION

Board material is used throughout an abundance of construction applications serving numerous different purposes. Board material or panel elements may for instance be used for forming large smooth surfaces such as a wall or a façade. In those cases, the board material is typically mounted directly onto some form of load bearing framework. Hence, the framework will typically support the structure at hand and the board material will only contribute to the strength of the structure to a limited amount. In this situation the board material is typically joined by being fixed directly onto the framework using screws, nails or similar.

As another example, board material or panel elements may be used in numerous applications where the board material significantly or completely contributes to the strength of the construction at hand. For instance, trailer cabinets, trailers, containers or similar may be formed of board material. Hence, the so formed structures will typically not include any load bearing framework meaning that any load and forces will be distributed in the board material itself.

When constructing load bearing constructions or structures of board or panel shaped material, the different boards of the board material will have to be joined to form the construction. In order to form a strong and durable construction, the joints joining the respective boards will inevitably have to be strong as well as durable. Moreover, the boards as such will also have to be strong and durable to cope with any forces it may be subjected to during the lifetime of the construction.

Several types of boards of various strengths and types may be used when forming constructions where the boards as such are the main load bearing elements. For instance, steel plates, wood fibre boards and glass fibre boards may be used to advantage. Further, sandwich boards, e.g. boards formed of a number of layers and typically a number of materials, may offer very strong boards with highly favourable strength to weight characteristics. The highly favourable strength to weight characteristics of sandwich boards make the use of sandwich boards appealing in constructions which are subjected to high loads and/or high dynamic loads. It has for instance been suggested to use sandwich boards in vehicle construction in order to achieve strong lightweight chassis.

For natural reasons, when forming structures with sandwich boards the need for strong joints becomes even more pronounced or else the advantage of the overall excellent strength of the sandwich boards cannot be fully utilized. In other words, the joints will typically have to be capable of handling loads corresponding to those that the sandwich boards can handle.

Several techniques for providing joints between sandwich boards exist. According to some techniques the boards are joined directly to each other by e.g. bolts, rivets, glue or similar. Another approach, generally offering a stronger joint, is to utilize some form of intermediate coupling detail to which the sandwich boards to be joined are fixed, thereby proving a joint. When using an intermediate coupling detail, a stronger joint with improved integrity may typically be achieved. The sandwich boards may in this case be fixed to the intermediate coupling detail using several techniques, such as bolting, riveting or gluing.

In order to enhance the joints offered by intermediate coupling details, it has been suggested to insert the sandwich boards to be joined into dedicated sockets and to fix the sandwich boards in these sockets. This approach has however proven troublesome to some extent. If the sandwich boards are mechanically fixed in the sockets, the sandwich boards will have to be manipulated and typically penetrated by mechanical fasteners which inevitably will lower the strength of the sandwich boards and also introduce an undesired uncertainty.

On the other hand, if glue is used to fix sandwich boards in the sockets, the sandwich boards can be left unaffected. However, in this case it has proven troublesome to achieve a strong joint since glue cannot easily be distributed in a controlled manner at the interface between the sockets and the sandwich boards.

SUMMARY OF THE INVENTION

In view of the above, it is an object of the present invention to provide an improved sandwich plate element connection system and an improved method for connecting two sandwich plate elements by means of a connection element.

Another object is to provide such a sandwich plate element connection system which provides a strong reliable adhesive joint between sandwich plate elements.

Another object is to provide such a sandwich plate element connection system which provides a reproducible adhesive joint between sandwich plate elements.

Another object is to provide such a sandwich plate element connection system which enables a controlled application of an adhesive.

Another object is to provide such a sandwich plate element connection system which enables the use of further types of adhesive.

Another object is to provide such a sandwich plate element connection system which is less prone to errors when being connected.

Another object is to provide such a sandwich plate element connection system which requires fewer tools when being formed.

Another object is to provide such a sandwich plate element connection system which allows shorter assembly time Another object is to provide such a sandwich plate element connection system which simplifies automated machine assembly.

Another object is to provide an improved chassis including an improved sandwich plate element connection system.

It is also an object to provide a cost-effective sandwich plate element connection system, chassis and method.

To achieve at least one of the above objects and also other objects that will be evident from the following description, sandwich plate element connection system having the features as defined in the claims is provided according to the present inventive concept. A chassis for a vehicle comprising a sandwich plate element connection system is provided as described in the present specification. A method for connecting two sandwich plate elements by means of a connection element is provided according to the claims. Preferred variations to the inventive concept will be evident from the dependent claims.

More specifically, according to a first aspect, there is provided a sandwich plate element connection system, comprising: two sandwich plate elements each comprising a plate core and a first and second plate skin, wherein the first plate skin is arranged to at least partly cover a first major surface of the plate core, thereby forming a first major outer surface of the sandwich plate element, and wherein the second plate skin is arranged to at least partially cover a second major surface of the plate core thereby forming a second major outer surface of the sandwich plate element, and a connection element connecting said two sandwich plate elements by means of an adhesive joint and defining two recesses, wherein each recess comprising a first and a second inner surface and holds an edge portion of one of the two sandwich plate elements such that at least a portion of the first major outer surface of the sandwich plate element interacts with the first inner surface of the recess and at least a portion of the second major outer surface of the sandwich plate element interacts with the second inner surface of the recess, wherein the connection element comprises a first part and a second part connected to each other by a snap fit joint, for formation of at least one of said two recesses in which the first inner surface is arranged on the first part and in which the second inner surface is arranged on the second part, wherein the adhesive joint comprises an adhesive which for each sandwich plate element is arranged between the first inner surface of the associated recess and the first major outer surface of the associated sandwich plate element and/or between the second inner surface of the associated recess and the second major outer surface of the associated sandwich plate element.

Hereby an improved sandwich plate element connection system is provided.

The sandwich plate element connection system comprises two sandwich plate elements and a connection element connecting said two sandwich plate elements by means of an adhesive joint. The adhesive joint comprises an adhesive.

Each sandwich plate element generally includes a plate core sandwiched between plate skins. The plate skins are generally formed of a material exhibiting a high material strength. In this way, the plate skins will typically contribute the overall strength of the sandwich plate elements to a high degree. The plate core is generally formed of a material exhibiting a lower material strength as compared to the plate skins. The plate core is generally formed of a material exhibiting a lower density as compared to the plate skins. In this plate configuration, the plate core ensures that the plate skins are kept at a desired distance from each other, i.e. the thickness of the plate, irrespective of if the sandwich plate is subjected to forces, such as bending forces. A sandwich plate element of the above kind is generally a high strength, light-weight plate element which may be used to advantage in a chassis for a vehicle. However, different characteristics of the plate skins and the core may be used to advantage, e.g. to tailor the sandwich plate elements to suit specific needs.

The connection element connects or couples the two sandwich plate elements by means of an adhesive joint. The connection element defines two recesses each having a first and a second inner surface. Each recess holds an edge portion of one of the two sandwich plate elements such that at least a portion of the first major outer surface of the sandwich plate element interacts with the first inner surface of the recess and at least a portion of the second major outer surface of the sandwich plate element interacts with the second inner surface of the recess.

The connection element comprises a first part and a second part connected to each other by a snap fit joint. The first part and a second part may be formed of the same material. The first part and a second part may be formed of different materials.

At least one of the two recesses is formed by connecting the snap fit joint. The first inner surface of the so formed recess is arranged on the first part and the second inner surface is arranged on the second part of the connection element.

It should be noted that within the context of this application the term "snap fit joint" may be any type of joint which may be formed by pushing two or more components having interlocking features of some kind into a mechanical engagement state where the components are locked or counteracted from being separated with respect to each other.

The adhesive joint as such comprises an adhesive which for each sandwich plate element is arranged between the first inner surface of the associated recess and the first major outer surface of the associated sandwich plate element and/or between the second inner surface of the associated recess and the second major outer surface of the associated sandwich plate element.

It should be noted that within the context of this application the term "adhesive" may be any type of material, paste, composition, tape or similar which is capable of bonding to a material, surface or similar by means of an adhesive force. The adhesive may for example be a glue. The adhesive may for example be a single component glue, a two-component glue or multi-component glue. The adhesive may for example be a tape. The adhesive may for example be a double-sided adhesive tape.

In other words, the adhesive of the adhesive joint may be present at the interface between the sandwich plate element and the first inner surface of the associated recess. The adhesive of the adhesive joint may be present at the interface between the sandwich plate element and the second inner surface of the associated recess. The adhesive of the adhesive joint may be present at the interface between the sandwich plate element and the first inner surface of the associated recess and at the interface between the sandwich plate element and the second inner surface of the associated recess. By providing the adhesive at the interface between the sandwich plate element and the first inner surface of the associated recess and at the interface between the sandwich plate element and the second inner surface of the associated recess a particularly strong connection may be achieved.

The same type of adhesive may be provided at the interface between the sandwich plate element and the first inner surface of the associated recess and at the interface between the sandwich plate element and the second inner surface of the associated recess.

A first type of adhesive may be provided at the interface between the sandwich plate element and the first inner surface of the associated recess and a second type of adhesive may be provided at the interface between the sandwich plate element and the second inner surface of the associated recess.

A glue may be provided at the interface between the sandwich plate element and the first inner surface of the associated recess and a double-sided tape may be provided at the interface between the sandwich plate element and the second inner surface of the associated recess or vice versa.

The sandwich plate element connection system thus provides for a controlled application of adhesive, such as a glue or tape, at the respective interfaces of the sandwich plate element connection system since the adhesive may be applied in a controlled manner at desired locations prior to engaging the snap fit joint. Moreover, the sandwich plate element connection system provides for the use of an adhesive tape in combination with a recess. This is because the adhesive tape may be applied in a controlled manner at desired locations prior to engaging the snap fit joint.

It is to be noted that the sandwich plate element connection system may comprise more than two sandwich plate elements and a connection element connecting said sandwich plate elements by means of an adhesive joint.

It is to be noted that the sandwich plate element connection system may comprise more than two sandwich plate elements and more than one connection element connecting said sandwich plate elements by means of adhesive joint.

The connection element may define more than two recesses.

The connection element may comprise other parts than the first part and the second part.

The connection element may comprise three parts wherein a respective recess is formed between adjacent parts by the part being connected to each other by a respective snap fit joint.

The connection element may comprise three parts forming four recesses formed by the parts being connected to each other by two snap fit joints.

The connection element may comprise four, five or six parts to give a few non limiting examples.

The first part and the second part may be configured such that the recess holds the edge portion of one of the sandwich plate elements with a press fit, which is advantageous in that an improved mechanical integrity may be achieved. A press fit as such will contribute to holding the edge portion of the sandwich plate element at hand in position. When an adhesive is used in combination with a press fit the thickness and hence the strength of the adhesive joint may be controlled. A press fit will assist in holding the edge portion of the sandwich plate element at hand in position while the adhesive is cured. An adhesive used in combination with a press fit may provide for a strong connection.

The snap fit joint may be formed with a male member on the first or second part of the connection element and a female member on the other one of the first or second part of the connection element, which is advantageous in that a reliable connection which is easy to engage may be achieved.

The snap fit joint may be elongated in a longitudinal direction of the connection element or may be discretely distributed along the longitudinal direction of the connection element, which is advantageous in that the design of the snap fit joint may be tailored to fulfil requirements in terms of strength as well as in terms of available space. By providing a snap fit joint which is elongated in a longitudinal direction of the connection element, a strong snap fit joint enabling a tight fit over an extended distance may be achieved. By providing a snap fit joint which is discretely distributed along the longitudinal direction of the connection element, a tailored snap fit joint with desired mechanical properties may be achieved. For instance, the snap fit joint may be provided where best needed in terms of transfer of forces. For instance, the snap fit joint may be provided such that it gives room for other features of the connection element or other entities. By providing a discretely distributed snap fit joint less material may be needed to form the connection element. By providing a discretely distributed snap fit joint a lighter connection element may be achieved.

The first and/or second part of the connection element may comprise a stop member configured to restrict a motion of the first part of the connection element in relation to the second part of the connection element in a direction of connecting the snap fit joint, which is advantageous in that the snap fit joint may be prevented from being pressed too far in its connection direction. By restricting a motion of the first part of the connection element in relation to the second part of the connection element in a direction of connecting the snap fit joint undesired compressive forces on the edge portion of the sandwich plate elements may be counteracted or eliminated. In other words, by providing a stop member configured to restrict a motion of the first part of the connection element in relation to the second part of the connection element in a direction of connecting the snap fit joint a compression stiff connection between the first part and the second part of the connection element may be achieved.

It should be noted that within the context of this application the term "direction of connecting the snap fit joint" may be any direction through which the snap fit joint may be connected.

The first and/or second part of the connection element may comprise a stop element defining a depth of the at least one recess, which is advantageous in that a controlled insertion depth of the edge portion of sandwich plate elements may be achieved. The stop element may be a mechanical stop restricting an insertion depth of the edge portion of the sandwich plate element into the recess. The stop element may include a notch, a protrusion, a pin or similar.

The adhesive may be a glue and/or an adhesive tape, which is advantageous in that properties of the adhesive joint may be tailored to suit different needs and/or different materials.

The first part and the second part of the connection element may form both of said two recesses, which is advantageous in that it provides for a controlled application of adhesive at both recesses. Moreover, by having the first part and the second part of the connection element form both of said two recesses a double-sided adhesive tape may be used to advantage at both recesses.

The first and second plate skin of a sandwich plate element may be made from a fibre-reinforced polymer material, which is advantageous in that the strong and lightweight sandwich plate element may be achieved.

The first and second plate skin of a sandwich plate element may be made from metal.

The first and second plate skin of a sandwich plate element may be made from a polymeric material.

The plate core of a sandwich plate element may be made from a polymeric foam, which is advantageous in that the strong and lightweight sandwich plate element may be achieved. Polymeric foam may absorb impacts and may be lightweight. The plate core may increase the thickness of the sandwich plate element thereby increasing bending stiffness while only marginally increasing the weight of the sandwich plate element.

Moreover, the use of a polymeric foam core may facilitate the forming of the sandwich plate elements by shaping the polymeric foam into a desired shape and subsequently forming the plate skins on the formed core. In other words, the core may be formed into a desired shape and the skins may be laminated on the core such that the skins follow an external contour of the core.

The plate core of a sandwich plate element may be made of wood.

The plate core of a sandwich plate element may be made of a material having a honeycomb structure.

The connection element may be made of metal. Metal is widely available, strong and is typically easy to manufacture high strength parts from.

The connection element may be made of aluminium.

The connection element may be made of extruded aluminium.

The connection element may be made by an extrusion process. By such a process it is possible to more easily form a strong connection element which may have a complicated cross-section.

The connection element may be made of a polymeric material.

The connection element may be made of a fibre reinforced polymeric material. Said fibre may include glass fibre, cellulose fibre, polymer fibre, carbon fibre textile fibre and/or metal fibre.

The connection element may be made from a polymer-based material. Polymer-based materials are cheap to manufacture, strong and may be easy to shape. Both connection elements made of metal and polymer-based materials may suitably be formed by $3d$ printing techniques.

According to another aspect of the invention, there is provided a chassis for a vehicle comprising a sandwich plate element connection system of the above described type, which is advantageous in that a strong and lightweight chassis may be provided.

The chassis may further comprise an auxiliary element connected to the connection element. Hence, an auxiliary element or an additional component may be connected to the connection element. Thereby additional components or auxiliary elements may be connected to the chassis without compromising the structural integrity and strength of the sandwich plate elements.

Examples of auxiliary elements may be wheel suspensions, fuel tanks, lights, engine mounts, seats, radiators, roofing, body components, rear-view mirrors, seat belts, battery mounts, impact protection elements, energy absorption elements, towing connectors, external luggage compartments, accelerator pedal mount, brake pedal mount, steering wheel assembly, steering gear assembly, coupling elements or other elements necessary for the functionality of a vehicle.

In general, features of this aspect of the invention provide similar advantages as discussed above in relation to the first aspect of the invention. Consequently, said advantages will not be repeated in order to avoid undue repetition. Hence, the details and advantages of this aspect of the invention are largely analogous to those of the first aspect of the invention, wherein reference is made to the above.

According to another aspect of the invention, there is provided a method for connecting two sandwich plate elements by means of a connection element, each sandwich plate element comprising a plate core and a first and second plate skin, wherein the first plate skin is arranged to at least partly cover a first major surface of the plate core, thereby forming a first major outer surface of the sandwich plate element, and wherein the second plate skin is arranged to at least partially cover a second major surface of the plate core thereby forming a second major outer surface of the sandwich plate element, the connection element defining two recesses, wherein each recess comprising a first and a second inner surface an is configured to hold an edge portion of one of the two sandwich plate elements such that at least a portion of the first major outer surface of the sandwich plate element interacts with the first inner surface of the recess and at least a portion of the second major outer surface of the sandwich plate element interacts with the second inner surface of the recess, wherein the connection element comprising a first part and a second part connectable to each other by means of a snap fit joint for formation of at least one of said two recesses, in which the first inner surface is arranged on the first part and in which the second inner surface is arranged on the second part, the method comprising: applying an adhesive to the first and/or second inner surface arranged on the first and second part and/or to the portion of the first outer major surface and/or to the portion of the second outer major surface of the sandwich plate element associated with the at the at least one of said two recesses, arranging, subsequent to applying the adhesive, the portion of the first outer major surface in contact with the first inner surface arranged on the first part, and connecting the second part to the first part by means of the snap fit joint for formation of the at least one of said two recesses, whereby the portion of the second outer major surface is brought in contact with the second inner surface arranged on the second part, such that the at least one recess holds the edge portion of the sandwich plate element associated therewith, thereby connecting said two sandwich plate elements, via the connection element, by means of an adhesive joint.

By the present method, two sandwich plate elements may be connected by means of a connection element and an adhesive joint. The adhesive joint is formed by connecting the second part to the first part by means of the snap fit joint for formation of the at least one of said two recesses.

Prior to connecting the second part to the first part an adhesive is arranged at desired locations, i.e. at the first and/or second inner surface arranged on the first and second part and/or to the portion of the first outer major surface and/or to the portion of the second outer major surface of the sandwich plate element associated with the at the at least one of said two recesses. In other words, the adhesive is applied at one, two, three or four locations prior to connecting the second part to the first part.

In general, features of this aspect of the invention provide similar advantages as discussed above in relation to the first aspect of the invention. Consequently, said advantages will not be repeated in order to avoid undue repetition. Hence, the details and advantages of this aspect of the invention are largely analogous to those of the first aspect of the invention, wherein reference is made to the above.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred variants of the present inventive concept, with reference to the appended drawings, where the same reference numerals will be used for similar elements, wherein.

DETAILED DESCRIPTION

Figure 1:
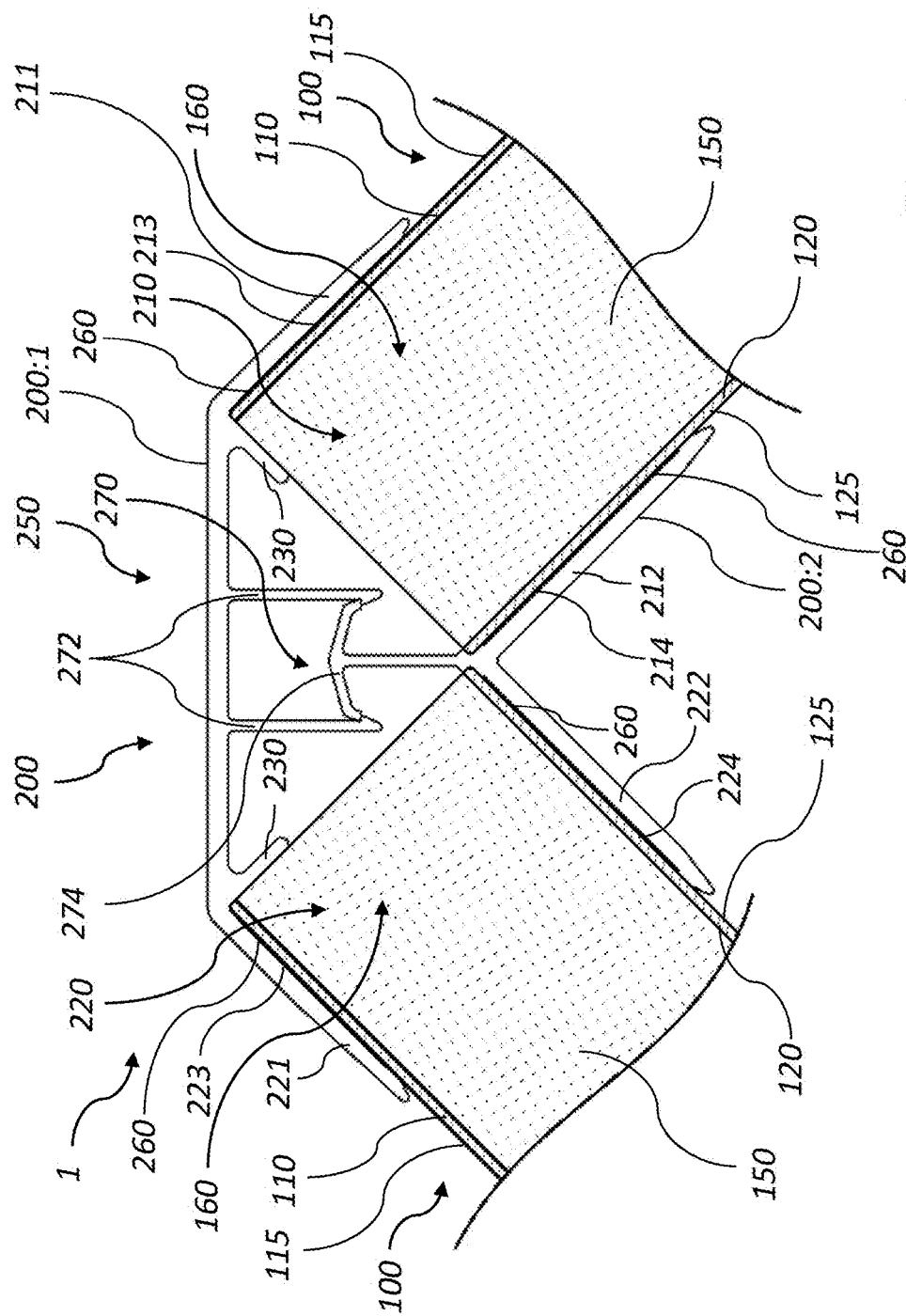
FIG. 1 is a cross sectional view of a sandwich plate element connection system in a connected state.

The present inventive concept will now be described more fully hereinafter with reference to the accompanying drawings, in which preferred variants of the inventive concept are shown. This inventive concept may, however, be embodied in many different forms and should not be construed as limited to the variants set forth herein; rather, these variants are provided for thoroughness and completeness, and fully convey the scope of the inventive concept to the skilled person. Like reference numerals refer to like elements throughout the description.

Initially a sandwich plate element connection system 1 will be described in a connected state, i.e. in a state where sandwich plate elements 100 are connected to each other via a connection element 200 by means of an adhesive joint 250. Followingly it will be described how the sandwich plate element connection system 1 is assembled with reference to FIGS. 2. Followingly, several variants and details of sandwich plate element connection systems 1, 2, 3, 4, 5 will be described with reference to FIGS. 3-6 and 8.

FIG. 1 is a cross sectional view of a sandwich plate element connection system 1. The sandwich plate element connection system 1 is depicted in a connected state where two sandwich plate elements 100 are connected to each other via a connection element 200 by means of an adhesive joint 250. The depicted sandwich plate element connection system 1 of FIG. 1 comprises two sandwich plate elements 100 and a connection element 200.

Each sandwich plate element 100 comprises a plate core 150, a first plate skin 110 and a second plate skin 120. The first plate skin 110 is arranged to at least partly cover a first major surface of the plate core 150, thereby forming a first major outer surface 115 of the sandwich plate element 100. The second plate skin 120 is arranged to at least partially cover a second major surface of the plate core 150 thereby forming a second major outer surface 125 of the sandwich plate element. The first and second major outer surfaces 115, 125 are opposite to each other. The first and second plate skins 110, 120 are attached to the plate core 150, and cover the plate core 150 as seen along a normal direction of the first or second plate skin 110, 120. The first and second plate skins 110, 120 each have a respective major outer surface 115, 125. The sandwich plate element 100 comprises an edge portion 160 at each of its edges.

In the depicted sandwich plate element 100, the plate core 150 is made of a polymeric foam in the form of polystyrene foam. In the depicted sandwich plate element 100, the first and second plate skins 110, 120 are made of a fibre-reinforced polymer material in form of glass fibre reinforced polyester resin. In other words, the depicted first and second plate skins 110, 120 are made of glass fibres in cured polyester resin. The first and second plate skins 110, 120 are bonded to the plate core 150 using an adhesive. Examples of suitable adhesives are multi-component adhesives such as polyester/polyurethane resin, a polyol/polyurethane resin or an acrylic/polyurethane resin. Other examples may include epoxy, cyanoacrylate, MMA or silicone.

As an alternative the plate core 150 may be made of polyurethane, polypropylene, PET or a combination of polyurethane and polystyrene foam. As an alternative the plate core 150 may be made of wood, such as solid wood or laminated veneer lumber, LVL. As an alternative the plate core 150 may be made of a honeycomb material structure.

Further, the first and second plate skins 110, 120 may alternatively be made of sheet metal, polymer-based materials, such as acrylic, PET, polypropylene, polycarbonate, acrylonitrile butadiene styrene, polyethylene, polystyrene, polyamide, vinyl ester-based materials, lignin, epoxy or a combination thereof. The first and second plate skins 110, 120 may be reinforced by fibres. Examples of suitable fibres are: flax fibres, thermoplastic fibres, carbon fibres, glass fibres, cotton fibres, hemp fibres, metal fibres and plastic fibres. The first and second plate skins 110, 120 may be made of different materials.

The sandwich plate elements 100, may have a thickness in the range of about 1 cm to about 15 cm. Other thicknesses may be used to advantage and to suit specific needs.

The connection element 200 is connecting the two sandwich plate elements 100 by means of the adhesive joint 250 and defines two recesses 210, 220, formed of flanges 211, 212, 221, 222. Each recess 210, 200 comprising a first and a second inner surface 213, 214, 223, 224 and holds the edge portion 160 of one of the two sandwich plate elements 100 as shown in FIG. 1. Hence, at least a portion of the first major outer surface 115 of the sandwich plate element 100 interacts with the first inner surface 213 of the recess 210 and at least a portion of the second major outer surface 125 of the sandwich plate element 100 interacts with the second inner surface 214 of the recess 210. Correspondingly, at least a portion of the first major outer surface 115 of the other sandwich plate element 100 interacts with the first inner surface 223 of the recess 220 and at least a portion of the second major outer surface 125 of said sandwich plate element 100 interacts with the second inner surface 224 of the recess 220.

The connection element 200 comprises a first part 200:1 and a second part 200:2 connected to each other by a snap fit joint 270. The two recesses 210, 220, formed of flanges 211, 212, 221, 222 are formed by connecting the snap fit joint 270. As can be seen in FIG. 1, the respective first inner surface 213, 223 of each of the two recesses 210, 220 are arranged on the first part 200:1 of the connection element

200. As can be seen in FIG. 1, the respective second inner surface 212, 224 of each of the two recesses 210, 220 are arranged on the second part 200:2 of the connection element 200.

The adhesive joint 250 comprises an adhesive 260. In the depicted sandwich plate element connection system 1 of FIG. 1, the adhesive 260 is provided in the form of a glue, such as epoxy. However, the adhesive 260 may be a double-sided adhesive tape. Different types of adhesive may be used in different locations in the sandwich plate element connection system 1. A glue and tape may be used in combination.

As can be seen in FIG. 1, the adhesive 260 is for each sandwich plate element 100 arranged between the first inner surface 213, 223 of the associated recess 210, 220 and the first major outer surface 115 of the associated sandwich plate element 100. The adhesive 260 is also arranged between the second inner surface 214, 224 of the associated recess 210, 220 and the second major outer surface 125 of the associated sandwich plate element. By providing the adhesive 260 at four different locations, a strong adhesive joint may be achieved.

The connection element 200 is depicted as having a right angle between the flanges 211 and 221, and between the flanges 212, 222. It is not necessary to have the flanges 211, 212, 221, 222 define a right angle, and the angle may instead be any desired angle depending on the needs. The connection element 200 depicted in FIG. 1 is made of extruded aluminium. As an alternative, the connection element 200 may be made of a different metal such as steel, iron, or a combination thereof.

Other suitable manufacturing techniques such as 3*d* printing, pultrusion or pullwinding may be used as an alternative to an extrusion process. The connection element 200 may be made from sheet metal or similar. Moreover, the connection element 200 may be made of polymer-based material, such as acrylic, PET, polypropylene, polycarbonate, acrylonitrile butadiene styrene, polyethylene, polystyrene, polyamide vinyl ester-based materials, lignin or epoxy. The polymer-based material may advantageously be reinforced by fibres such as flax fibres, thermoplastic fibres, carbon fibres, glass fibres, cotton fibres, hemp fibres, metal fibres, plastic fibres or any other sufficiently strong fibrous material, or a combination thereof.

As can be seen in FIG. 1, the first part 200:1 and the second part 202:2 of the connection element 200 are formed in a way such that the recesses 210, 220 formed by connecting the snap fit joint 270 holds the edge portion 160 of each sandwich plate element 100 with a press fit. In other words, the flanges 211, 212 exert a compressive force on the sandwich plate element 100 received in recess 210. Correspondingly, the flanges 221, 222 exert a compressive force on the sandwich plate element 100 received in recess 220. This means that the respective compressive forces exerted on the respective sandwich plate elements 100 are introduced while connecting the snap fit joint 270.

As can be seen in FIG. 1, the snap fit joint 270 formed with a female member 272 on the first part 200:1 of the connection element 200 and a male member 274 on the second part 200:2 of the connection element 200.

As can be seen in FIG. 1, the first part 200:1 of the connection element 200 comprises a stop element 230 defining a depth for each recess 210, 220. The stop element 230 of the depicted connection element 200 is designed as an integrally formed protrusion in the first part 200:1 of the connection element 200. The stop element 230 counteracts or prevents that the sandwich plate elements 100 are pushed too far into the respective recesses 210, 220.

Figure 2:
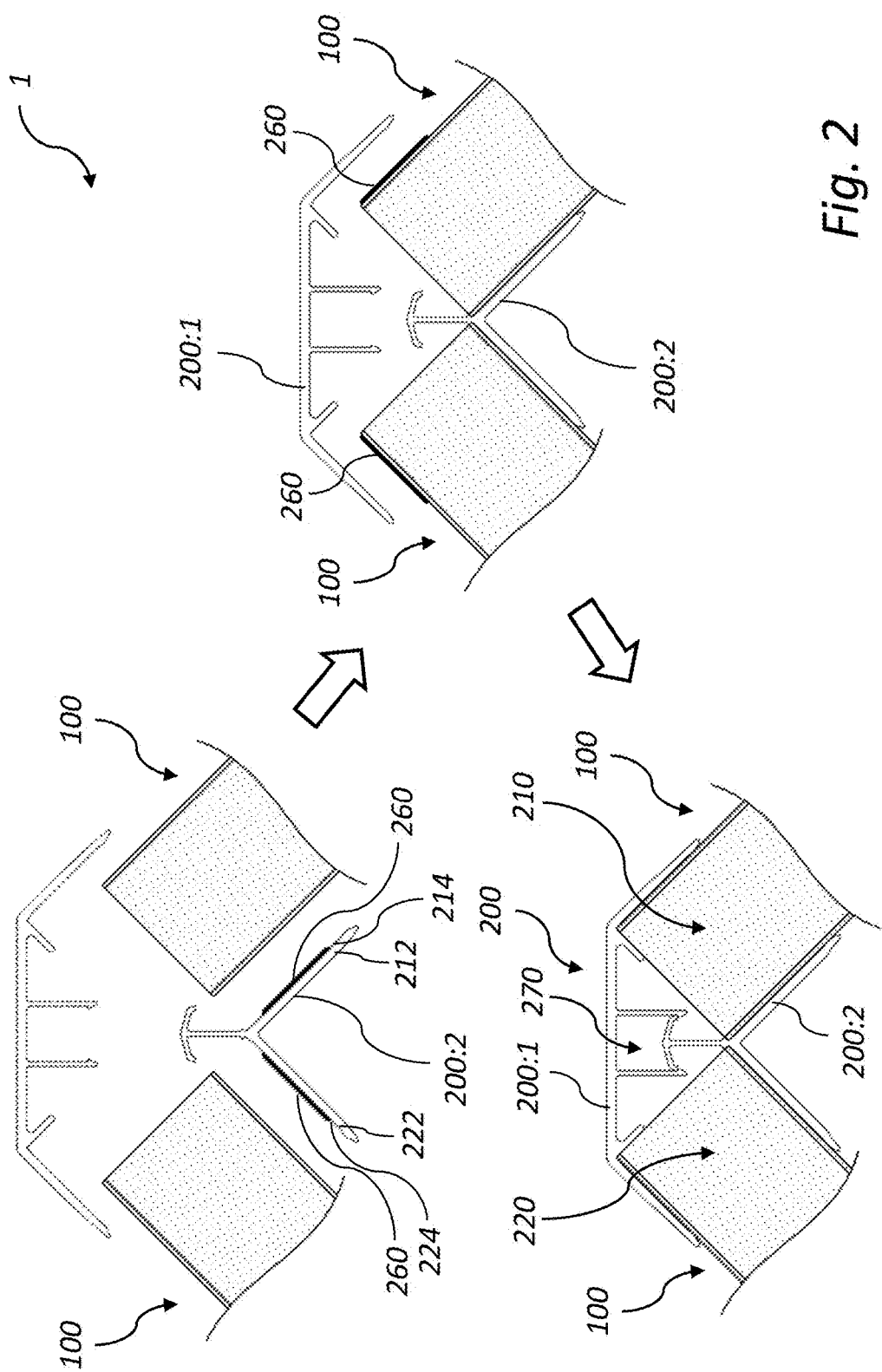
FIG. 2 is an image sequence showing how the sandwich plate element connection system of FIG. 1 is assembled.

Now referring also to FIG. 2 here is conceptually depicted how the sandwich plate element connection system 1 of FIG. 1 is assembled thereby connecting the two sandwich plate elements 100. The sequence of connecting the two sandwich plate elements 100 by assembling the sandwich plate element connection system 1 is indicated by arrows in FIG. 2.

As can be seen in the upper left image of FIG. 2, the adhesive 260 is initially provided at the second inner surfaces 214, 224 of the recesses 210, 220 to be formed. The second inner surfaces 214, 224 are as described above provided at the flanges 212, 222 or the second part 200:2 of the connection element 200.

Followingly, the adhesive 260 is provided at edge portions 160 of the first outer major surface 115 of the sandwich plate elements 100 as can be seen in the right image of FIG. 2. Further, the sandwich plate elements 100 are brought into contact with the adhesive 260 provided at the second inner surfaces 214, 224 of the recesses 210, 220 to be formed as can be seen in the right image of FIG. 2.

Followingly, the first part 200:1 of the connection element 200 is connected to the second part 200:2 of the connection element 200 by means of the snap fit joint 270 as can be seen in the lower left image of FIG. 2. Hence the first part 200:1 of the connection element 200 and the second part 200:2 of the connection element 200 are pressed together such that the male part and the female part of the snap fit joint 270 engages and hence forms the snap fit joint 270 while forming the two recesses 210, 220. The sandwich plate elements 100 are consequently connected by the connection element 200 by means of the adhesive joint 250.

As is described above and shown in FIG. 2, the adhesive 260 is applied to free surfaces that are laid together and pressed together in a controlled manner. This means that the adhesive 260 may be applied where needed in an amount needed for the adhesive joint 250. The free surfaces with the adhesive 260 is advantageously put together in a normal direction thereof such that the adhesive 260 is not subjected to any transversal forces that otherwise would risk altering the location and distribution of the applied adhesive 260.

Further, the fact that the adhesive 260 is applied to free surfaces that are laid together and pressed together in a controlled manner allows for that an adhesive tape may be used as the adhesive 260. An adhesive tape cannot be used to advantage e.g. when a sandwich plate element 100 is to be slid into a recess of fixed width.

Figure 3:
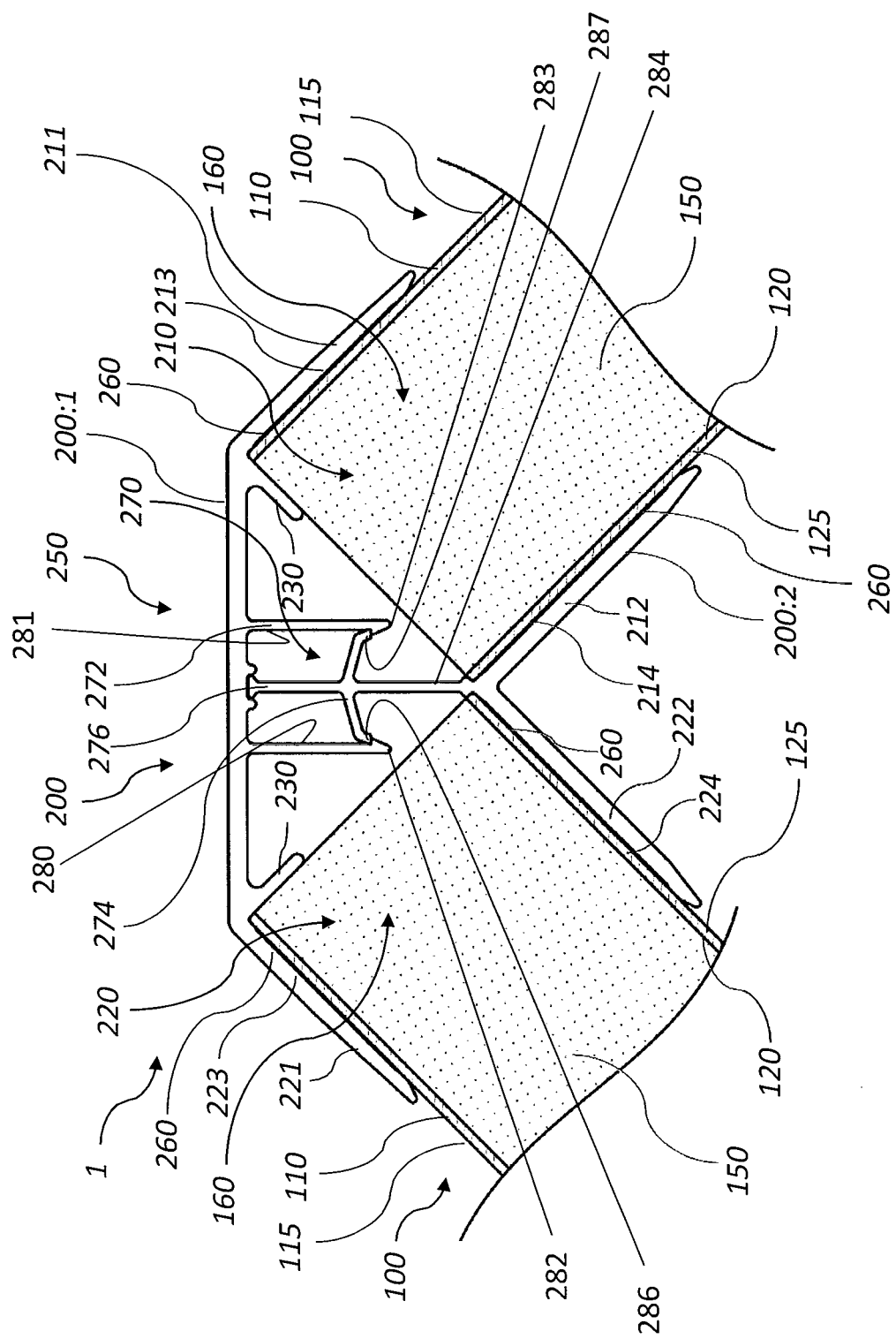
FIG. 3 is a cross sectional view of a sandwich plate element connection system in a connected state.

Now referring to FIG. 3, here is conceptually depicted a different variant of the sandwich plate element connection system 1 of FIG. 1. The sandwich plate element connection system 1 of FIG. 3 is in most aspects similar to the sandwich plate element connection system 1 of FIG. 1. It is additionally noted that the snap fit joint 270 comprises least one first hooking flange extending from the first part and at least one second hooking flange having a second hook portion, wherein the first hook portion of the at least one first hooking flange engages behind the second hook portion of the respective at least one second hooking flange. As shown in FIG. 3, the at least one first hooking flange comprises two first hooking flanges 280, 281 extending perpendicularly from the first part 200:1 between two first flanges 211, 221, and the at least one second hooking flange comprises one second hooking flange 284 formed at a vertex between two second flanges 212, 222 of the second part 200:2. The second hook portions 286, 287 extend from each side of the second hooking flange 284 and respectively engage behind the two first hook portions 282, 283 formed on each of the two first hooking flanges 280, 281. Only differences between the sandwich plate element connection system 1 of FIG. 3 and the sandwich plate element connection system 1 of FIG. 1 will be described below to avoid undue repetition.

As can be seen in FIG. 3, the first part 200:1 of the connection element 200 is provided with a stop member 276. The stop member 270 of the depicted sandwich plate element connection system 1 of FIG. 3 is a protrusion 276 arranged on the male member 274 of the snap fit joint 270. The stop member 270 is thus provided at the second part 202:2 of the connection element 200 and is configured to hit a wall of the first part 200:1 of the connection element 200 when the male part and the female part of the snap fit joint 270 engages and hence forms the snap fit joint 270 while forming the two recesses 210, 220.

The stop member 276 is configured to restrict a motion of the first part 200:1 of the connection element 200 in relation to the second part 200:2 of the connection element 200 in a direction of connecting the snap fit joint 270. In other words, the stop member 276 will counteract or prevent that the first part 200:1 of the connection element 200 is pressed too far towards the second part 200:2 of the connection element 200 when male part and the female part of the snap fit joint 270 engages and hence forms the snap fit joint 270 while forming the two recesses 210, 220.

Moreover, the stop member 276 will counteract or prevent that the first part 200:1 of the connection element 200 is pressed further towards the second part 200:2 of the connection element 200 after formation of the snap fit joint 270. This means that an undesired compression of the sandwich plate elements 100 may be counteracted or prevented. Such undesired compression of the sandwich plate elements 100 may otherwise occur when the sandwich plate element connection system 1 is subjected to forces, such as bending forces exerted on the sandwich plated elements 100. In other words, a compression stiff connection between the first part 200:1 and the second part 200:2 of the connection element 200 may be achieved.

Figure 4:
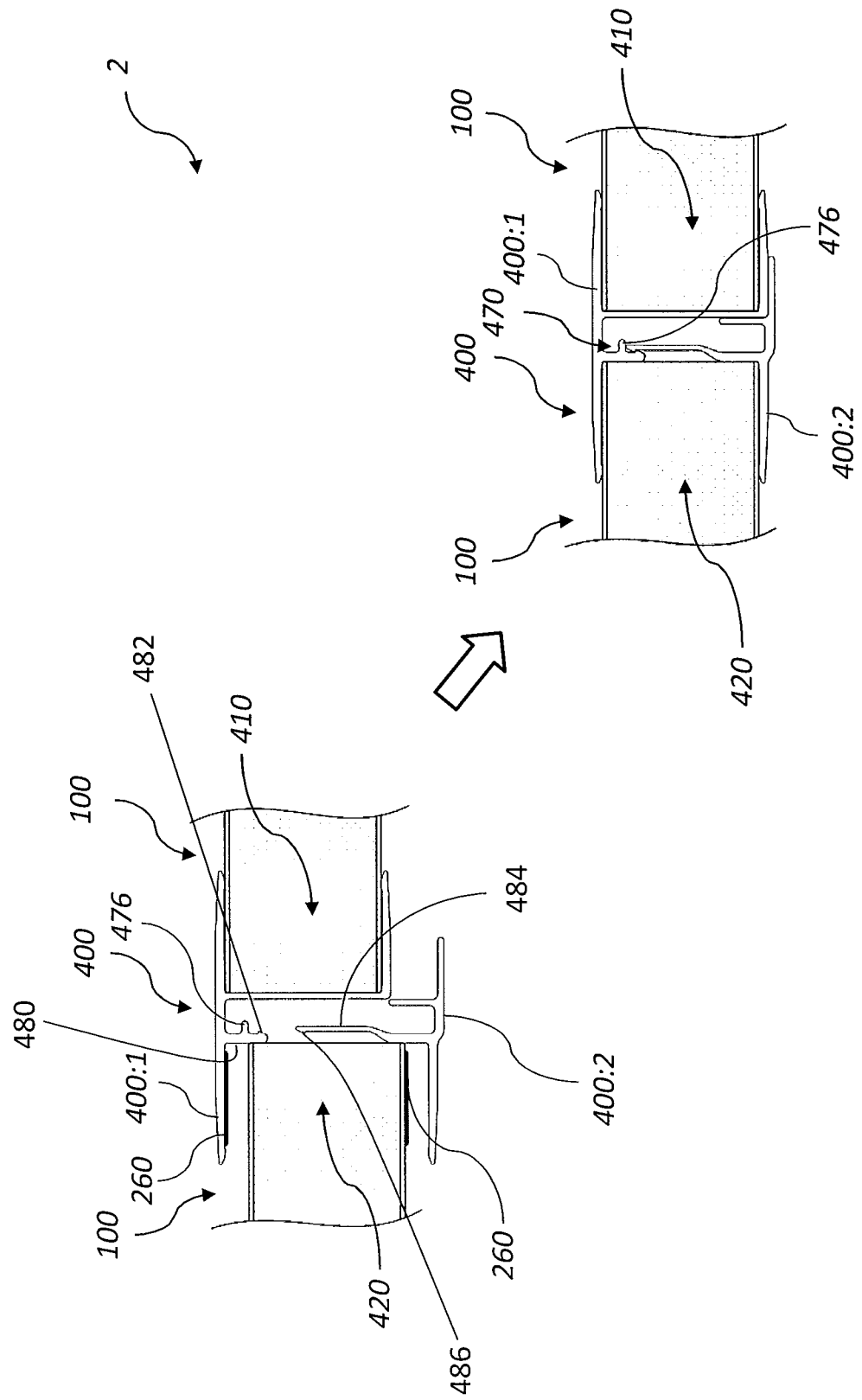
FIG. 4 are cross sectional views of a sandwich plate element connection system.

Now referring also to FIG. 4, here is conceptually depicted a variant of a sandwich plate element connection system 2. It is also depicted how the sandwich plate element connection system 2 is assembled thereby connecting the two sandwich plate elements 100. The sequence of connecting the two sandwich plate elements 100 by assembling the sandwich plate element connection system 2 is indicated by an arrow in FIG. 4. The depicted sandwich plate element connection system 2 of FIG. 4 comprises two sandwich plate elements 100 and a connection element 400. The sandwich plate elements 100 are of the type described above in conjunction with FIG. 1. The sandwich plate element connection system 2 has many features in common with the above described sandwich plate element connection system 1. Only differences between the sandwich plate element connection system 2 and sandwich plate element connection system 1, relevant for the understanding will be described to avoid undue repetition.

As can be seen in the upper left image of FIG. 4, the connection element 400 comprises a first part 400:1 and a second part 400:2. The first part 400:1 comprises a fixed recess 410. An edge portion of one of the sandwich plate elements 100 is inserted and held in the fixed recess 410. The fixed recess 410 is formed of flanges having first and second inner surfaces. The first and second inner surfaces of the fixed recess interact with the first and second major outer surfaces of said sandwich plate element 100. The sandwich plate element 100 may be held in the fixed slot 410 by any suitable adhesive technique such as by gluing.

A recess 420 is formed by connecting the first part 400:1 and the second part 400:2 of the connection element 400, as can be seen in the lower right image of FIG. 4.

Prior to connecting the first part 400:1 and the second part 400:2 of the connection element 400 an adhesive 260 is provided at an inner surface of the recesses 420 to be formed and at an edge portion of the sandwich plate element 100 as can be seen in the upper left image of FIG. 4. The first part 400:1 and the second part 400:2 of the connection element 400 are thereafter connected to each other by a snap fit joint 470 while forming the recess 420 as can be seen in the lower right image of FIG. 4. As shown in FIG. 4, the at least one first hooking flange comprises only one first hooking flange 480 having only one first hook portion 481, the only one first hooking flange extending from the first part, and the at least one second hooking flange comprises only one second hooking flange 484 having only one second hook portion 486. As shown in the lower right image of FIG. 4, the only one first hook portion of the only one first hooking flange engages behind the only one second hook portion of the only one second hooking flange, and the stop is a protrusion 476 extending from the first part configured to contact a surface of the second hooking flange when the sandwich plate element connection is assembled.

The snap fit joint 470 comprises a stop member 476. The stop member 476 is provided at and integrally formed with the first part 400:1. The stop member 476 is configured to restrict a motion of the first part 400:1 of the connection element 400 in relation to the second part 400:2 of the connection element 400 in a direction of connecting the snap fit joint 470.

Figure 5:
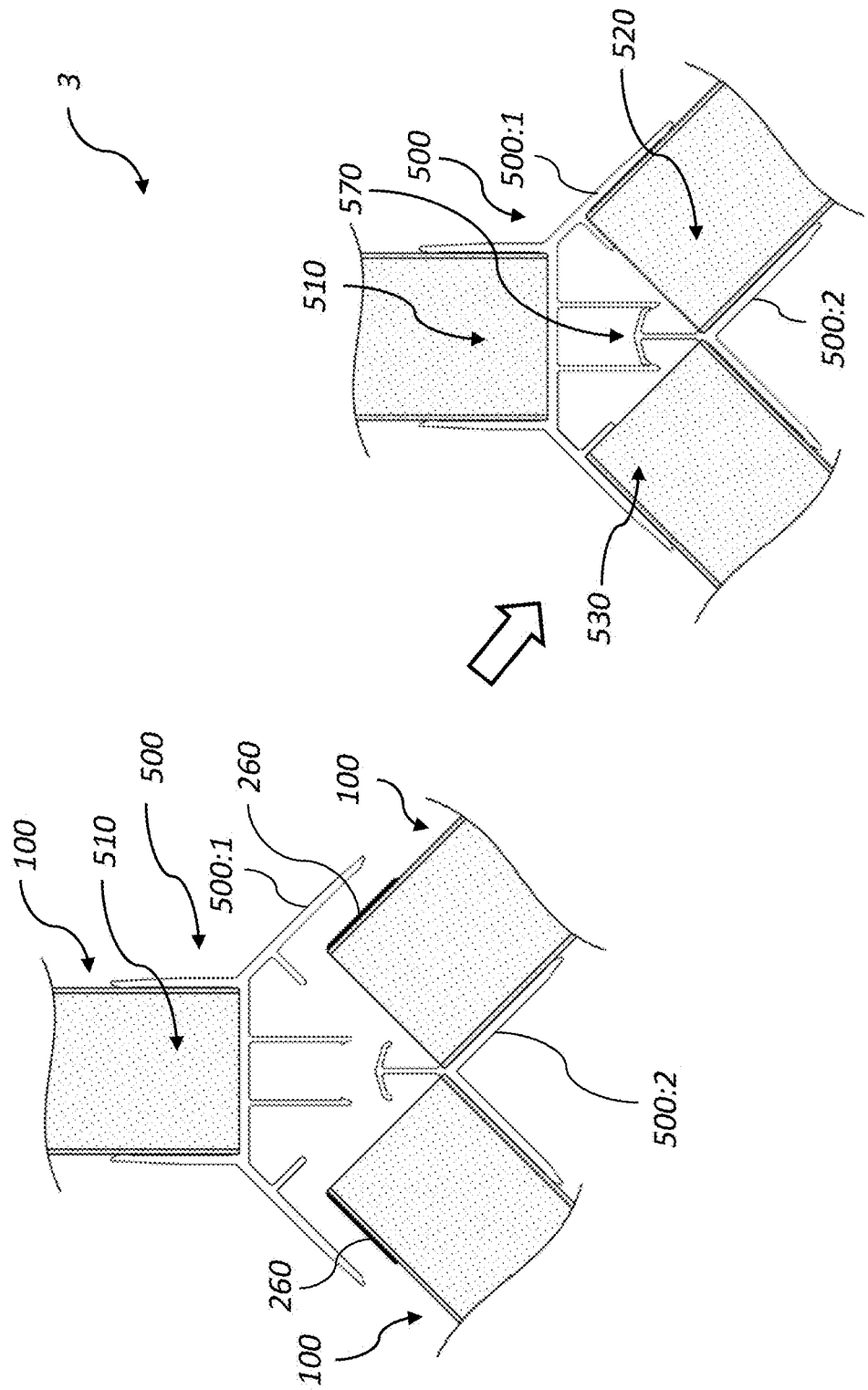
FIG. 5 are cross sectional views of a sandwich plate element connection system.

Now referring also to FIG. 5, here is conceptually depicted a variant of a sandwich plate element connection system 3. It is also depicted how the sandwich plate element connection system 3 is assembled thereby connecting the three sandwich plate elements 100. The sequence of connecting the three sandwich plate elements 100 by assembling the sandwich plate element connection system 3 is indicated by an arrow in FIG. 5. The depicted sandwich plate element connection system 3 of FIG. 5 comprises three sandwich plate elements 100 and a connection element 500. The sandwich plate elements 100 are of the type described above in conjunction with FIG. 1. The sandwich plate element connection system 3 has many features in common with the above described sandwich plate element connection systems 1 and 2. Only differences between the sandwich plate element connection system 3 and sandwich plate element connection systems 1 and 2, relevant for the understanding will be described to avoid undue repetition.

As can be seen in the upper left image of FIG. 5, the connection element 500 comprises a first part 500:1 and a second part 500:2. The first part 500:1 comprises a fixed recess 510. An edge portion of one of the sandwich plate elements 100 is inserted and held in the fixed recess 510. The fixed recess 510 is formed of flanges having first and second inner surfaces. The first and second inner surfaces of the fixed recess 510 is interacting with the first and second major outer surfaces of said sandwich plate element 100. The sandwich plate element 100 may be held in the fixed recess 510 by any suitable adhesive technique such as by gluing.

Two recesses 520, 530 are formed by connecting the first part 500:1 and the second part 500:2 of the connection element 500, as can be seen in the lower right image of FIG. 5.

Prior to connecting the first part 500:1 and the second part 500:2 of the connection element 500 an adhesive 260 is provided at relevant desired locations. The first part 500:1 and the second part 500:2 of the connection element 500 are thereafter connected to each other by a snap fit joint 570 while forming the recesses 520, 530 as can be seen in the lower right image of FIG. 5.

Figure 6:
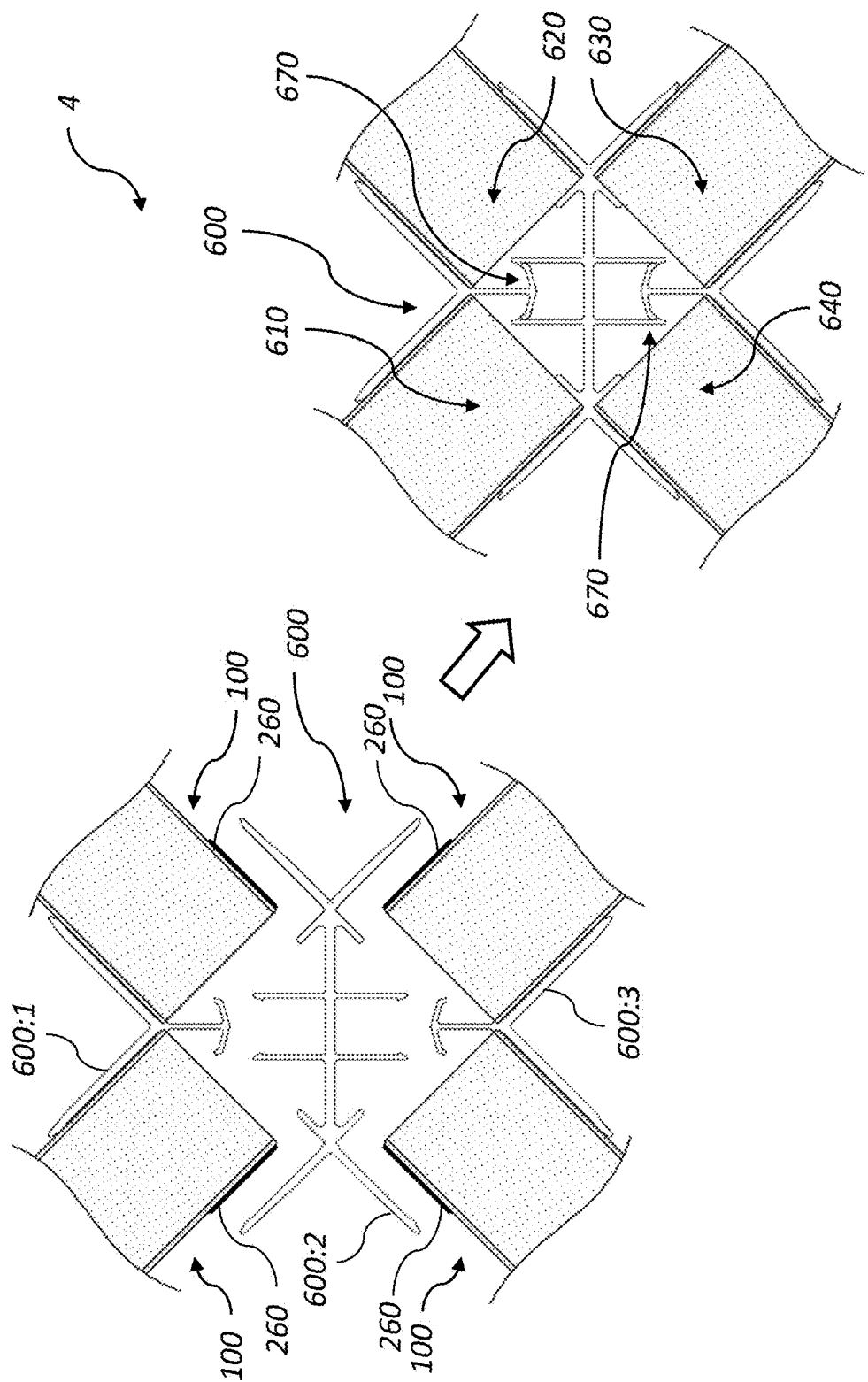
FIG. 6 are cross sectional views of a sandwich plate element connection system.

Now referring also to FIG. 6, here is conceptually depicted a variant of a sandwich plate element connection system 4. It is also depicted how the sandwich plate element connection system 4 is assembled thereby connecting the four sandwich plate elements 100. The sequence of connecting the three sandwich plate elements 100 by assembling the sandwich plate element connection system 4 is indicated by an arrow in FIG. 6. The depicted sandwich plate element connection system 4 of FIG. 6 comprises four sandwich plate elements 100 and a connection element 600. The sandwich plate elements 100 are of the type described above in conjunction with FIG. 1. The sandwich plate element connection system 4 has many features in common with the above described sandwich plate element connection systems 1, 2 and 3. Only differences between the sandwich plate element connection system 4 and sandwich plate element connection systems 1, 2 and 3, relevant for the understanding will be described to avoid undue repetition.

Four recesses 610, 620, 630, 640 are formed by connecting the first part 600:1, the second part 600:2 and the third part 600:3 of the connection element 600, as can be seen in the lower right image of FIG. 6.

Prior to connecting the first part 600:1, the second part 600:2 and the third part 600:3 of the connection element 600, an adhesive 260 is provided at relevant desired locations. The first part 600:1, the second part 600:2 and the third part 600:3 of the connection element 600, are thereafter connected to each other by a respective snap fit joint 670 while forming the recesses 610, 620, 630, 640 as can be seen in the lower right image of FIG. 6.

Figure 7:
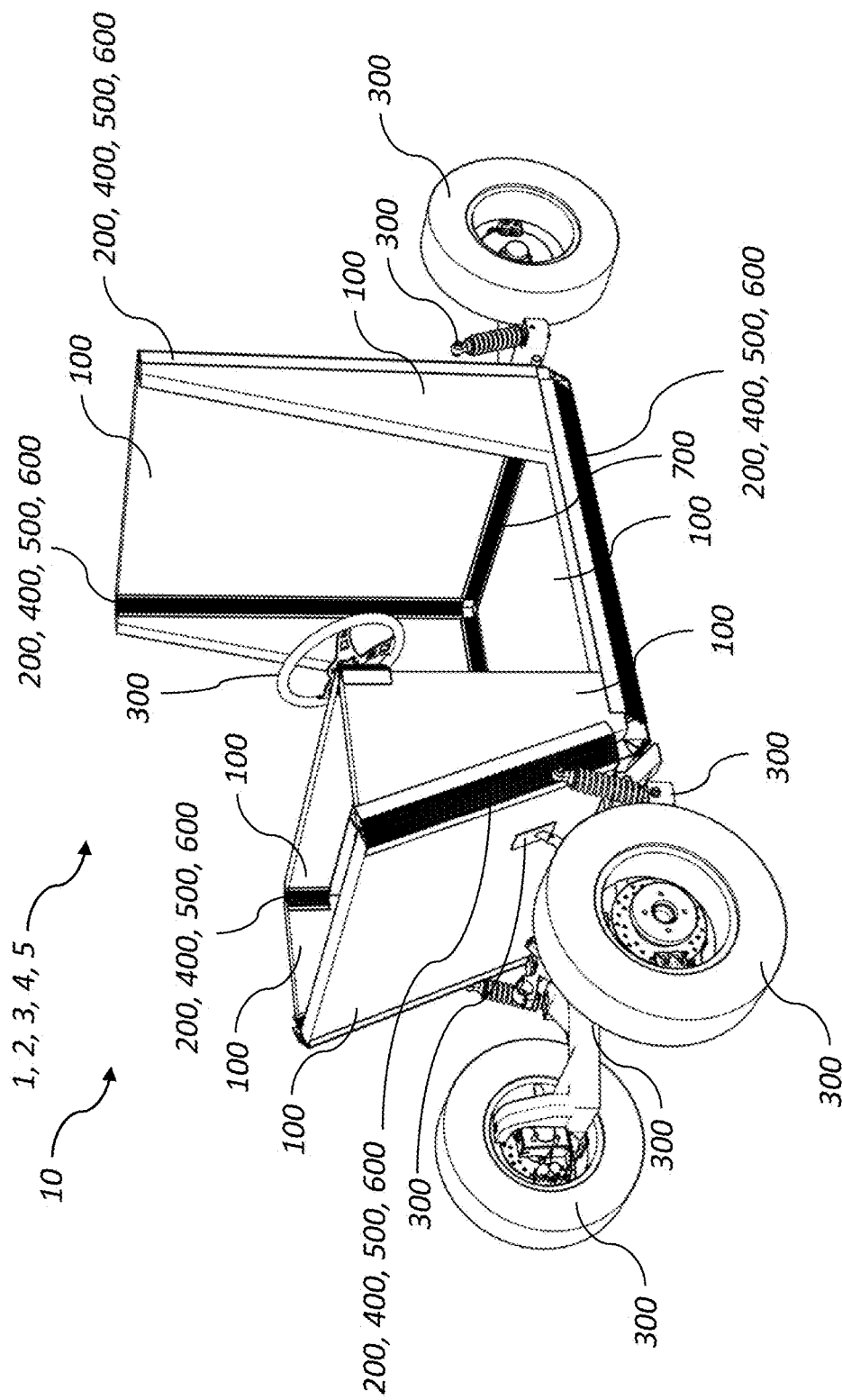
FIG. 7 conceptually illustrates a chassis for a vehicle.

Now referring to FIG. 7, here is conceptually depicted a schematic perspective view of a chassis for a vehicle 10. The chassis 10 comprises a sandwich plate element connection system 1, 2, 3, 4, 5. The sandwich plate element connection system 1, 2, 3, 4, 5 may be of any of the types described above in conjunction with FIGS. 1-6 or of the type described below with reference to FIG. 8. Hence, the chassis 10 comprises a plurality of sandwich plate elements 100 and a plurality of connection elements 200, 400, 500, 600, 700 for connecting said plurality of sandwich plate elements 100.

The chassis 10 further comprises auxiliary elements 300. The auxiliary elements 300 are connected to the connection elements 200, 400, 500, 600, 700 of the chassis 10. The schematically depicted auxiliary elements 300, in form of e.g. wheel suspension, wheels, a steering wheel and a steering array are shown in FIG. 7 to more clearly illustrate the design and functionality of the chassis 10.

Figure 8:
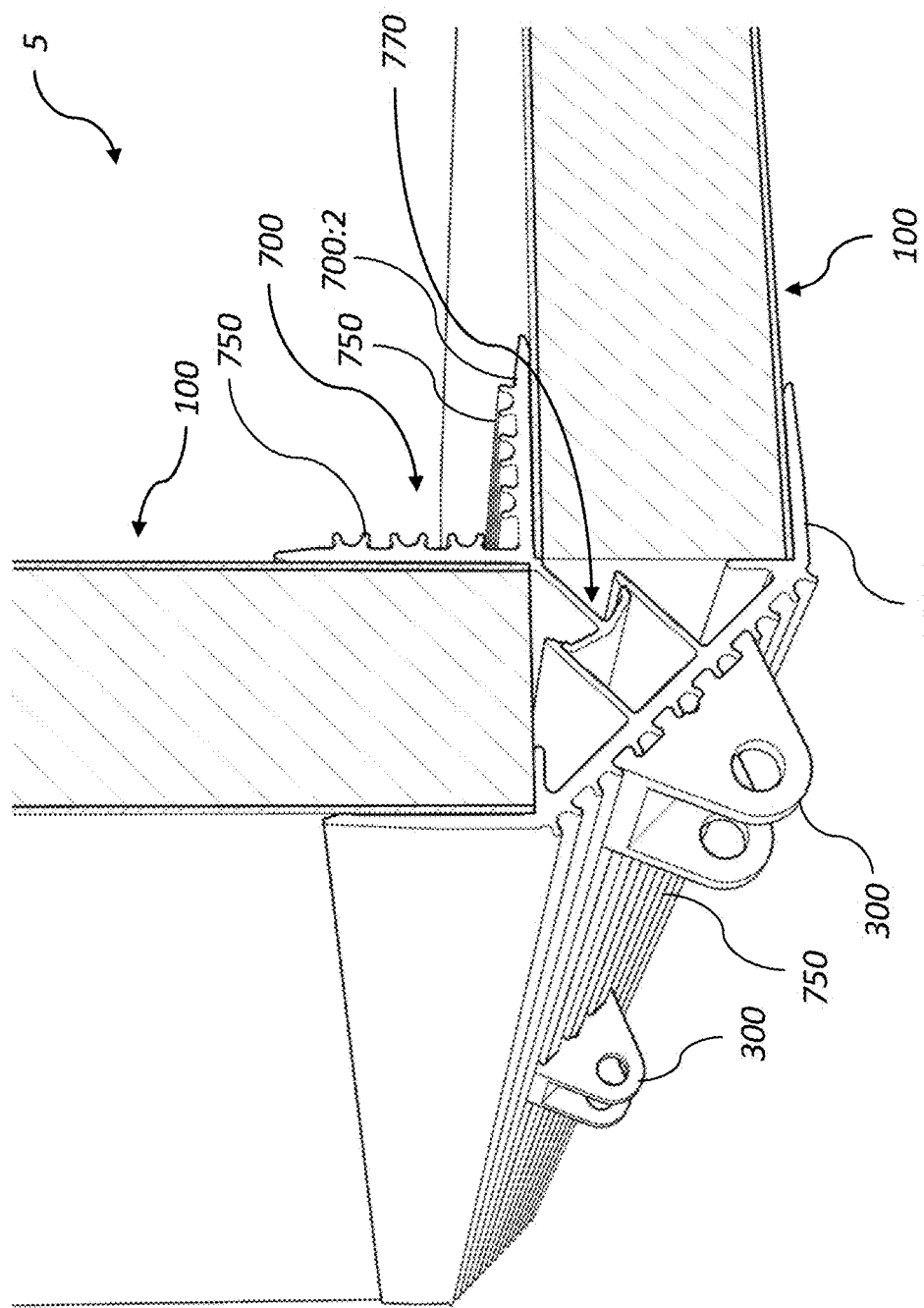
FIG. 8 is a perspective detail view of a sandwich plate element connection system used in the chassis of FIG. 7 to connect auxiliary elements.

Now referring to FIG. 8, here is conceptually depicted how two auxiliary elements 300 are connected to a sandwich plate element connection system 5. The sandwich plate element connection system 5 comprises a connection element 700. The connection element 700 comprises a first part 700:1 and a second part 700:2 connected by a snap fit joint 770. The sandwich plate element connection system 5 of FIG. 8 is in most aspects similar to the sandwich plate element connection system 1 of FIG. 1. Only differences between the sandwich plate element connection system 5 of FIG. 8 and the sandwich plate element connection system 1 of FIG. 1 will be described below to avoid undue repetition.

The connection element 700 is provided with a connection configuration 750 for a mortise and tenon type joint on three external surfaces thereof. Two of said external surfaces are located on the second part 700:2 whereas one of the external surfaces is located on the first part 700:1. The respective connection configuration 750 comprises a plurality of projections of tenon type. A plurality of slots of mortise type are formed between the projections.

The auxiliary elements 300 are connected to the connection element 700 by means of the connection configuration 750 provided on said external surface of the first part 700:1 of the connection element 700. Hence, the auxiliary elements 300 are connected to the connection element 700 by means of a joint of mortise and tenon type.

The connection element 700 of FIG. 8 is indicated in the chassis of FIG. 7 although depicted from a different angle in FIG. 8.

In FIG. 8 it has been illustrated how auxiliary elements 300 may be connected to the connection element 700 by means of a connection configuration 750 under formation of a joint of mortise and tenon type. However, auxiliary elements 300 may equally well be connected to any of the above described connection elements 200, 400, 500, 600, 700 using any suitable technique, such as bolting, riveting, welding, gluing or similar. Auxiliary elements 300 may thus be connected to any of the above described connection elements 200, 400, 500, 600, 700 without affecting the integrity of the sandwich plate elements 100.

Figure 9:
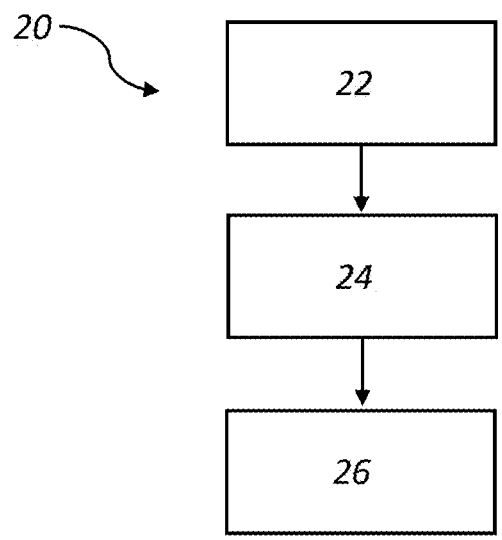
FIG. 9 is a flow scheme for connecting two sandwich plate elements by means of a connection element.

Now referring to FIG. 9 here is shown a flow chart of a method 20 for connecting two sandwich plate elements 100 by means of a connection element 200, 400, 500, 600, 700.

Each sandwich plate element 100 to be connected comprises a plate core 150 and a first and second plate skin 110, 120. The first plate skin 110 is arranged to at least partly cover a first major surface of the plate core 150, thereby forming a first major outer surface 115 of the sandwich plate element 100. The second plate 120 skin is arranged to at least partially cover a second major surface of the plate core 150 thereby forming a second major outer surface 125 of the sandwich plate element. The connection element 200, 400, 500, 600, 700 defines two recesses 210, 220, 410, 420, 510, 520, 530, 610, 620, 630, 640. The connection element may define more than two recesses 210, 220, 410, 420, 510, 520, 530, 610, 620, 630, 640. Each recess 210, 220, 410, 420, 510, 520, 530, 610, 620, 630, 640 comprises a first and a second inner surface 213, 214, 223, 224 and is configured to hold an edge portion 160 of one of the two sandwich plate elements 100 such that at least a portion of the first major outer surface 115 of the sandwich plate element 100 interacts with the first inner surface 213, 214, 223, 224 of the recess 210, 220, 410, 420, 510, 520, 530, 610, 620, 630, 640 and at least a portion of the second major outer surface 125 of the sandwich plate element 100 interacts with the second inner surface of the recess 213, 214, 223, 224. The connection element 200, 400, 500, 600, 700 comprises a first part 200:1, 400:1, 500:1, 600:1, 700:1 and a second part 200:2, 400:2, 500:2, 600:2, 700:2 connectable to each other by means of a snap fit joint 270, 470, 570, 670, 770 for formation of at least one of said two recesses 210, 220, 410, 420, 510, 520, 530, 610, 620, 630, 640. The first inner surface 213, 214, 223, 224 is arranged on the first part 200:1, 400:1, 500:1, 600:1, 700:1 and the second inner surface 213, 214, 223, 224 is arranged on the second part 200:2, 400:2, 500:2, 600:2, 700:2. The connection element 200, 400, 500, 600, 700 may comprise more than two parts. The connection element 200, 400, 500, 600, 700 may comprise a third part 600:3.

The method includes applying 22 an adhesive 160 to the first and/or second inner surface 213, 214, 223, 224 arranged on the first and second part 200:1, 400:1, 500:1, 600:1, 700:1, 200:2, 400:2, 500:2, 600:2, 700:2 and/or to the portion of the first outer major surface 115 and/or to the portion of the second outer major surface 125 of the sandwich plate element 100 associated with the at the at least one of said two recesses 210, 220, 410, 420, 510, 520, 530, 610, 620, 630, 640. Hence, the adhesive 160 is applied in one, two, three or four locations for a recess being formed by connecting the first part and the second part.

The method 20 proceeds by arranging 24 the portion of the first outer major surface 160 in contact with the first inner surface 213, 214, 223, 224 arranged on the first part 200:1, 400:1, 500:1, 600:1, 700:1.

The method 20 proceeds by connecting 26 the second part 200:2, 400:2, 500:2, 600:2, 700:2 to the first part 200:1, 400:1, 500:1, 600:1, 700:1 by means of the snap fit joint 270, 470, 570, 670, 770 for formation of the at least one of said two recesses 210, 220, 410, 420, 510, 520, 530, 610, 620, 630, 640. When connecting the second part 200:2, 400:2, 500:2, 600:2, 700:2 to the first part 200:1, 400:1, 500:1, 600:1, 700:1, the portion of the second outer major surface 125 is brought in contact with the second inner surface 213, 214, 223, 224 arranged on the second part 200:2, 400:2, 500:2, 600:2, 700:2, such that the at least one recess 210, 220, 410, 420, 510, 520, 530, 610, 620, 630, 640, holds the edge portion 160 of the sandwich plate element 100 associated therewith, thereby connecting said two sandwich plate elements 100, via the connection element 200, 400, 500, 600, 700, by means of an adhesive joint 250.

It will be appreciated that the present inventive concept is not limited to the variants shown. Several modifications and variations are thus conceivable within the scope of the invention which thus is defined by the appended claims.

The invention claimed is:

1. A sandwich plate element connection system, comprising:
two sandwich plate elements each comprising a plate core and a first and second plate skin,
wherein the first and second plate skin are made from a fibre-reinforced polymer material or from metal, wherein the first plate skin is arranged to at least partly cover a first major surface of the plate core, thereby forming a first major outer surface of the sandwich plate element, and
wherein the second plate skin is arranged to at least partially cover a second major surface of the plate core thereby forming a second major outer surface of the sandwich plate element, said first and second major outer surfaces being opposite to each other, and
a connection element connecting said two sandwich plate elements by means of an adhesive joint and defining two recesses,
wherein each recess comprising a first and a second inner surface and holds an edge portion of one of the two sandwich plate elements such that at least a portion of the first major outer surface of the sandwich plate element interacts with the first inner surface of the recess and at least a portion of the second major outer surface of the sandwich plate element interacts with the second inner surface of the recess,
wherein the connection element comprises a first part and a second part connected to each other by a snap fit joint comprising interlocking features wherein the first part and the second part are locked by mechanical engagement from being separated with respect to each other, for formation of at least one of said two recesses in which the first inner surface is arranged on the first part and in which the second inner is arranged on the second part, and
wherein the adhesive joint comprises an adhesive which for each sandwich plate element is arranged between the first inner surface of the associated recess and the first major outer surface of the associated sandwich plate element and between the second inner surface of the associated recess and the second major outer surface of the associated sandwich plate element;
wherein the interlocking feature of the first part is formed by at least one first hooking flange having a first hook portion, the at least one first hooking flange extending from the first part,
the interlocking feature of the second part is formed by at least one second hooking flange having a second hook portion, the at least one second hooking flange extending from the second part,
wherein the first hook portion of the at least one first hooking flange engages behind the second hook portion of the respective at least one second hooking flange, and
wherein the first and/or second part of the connection element comprises a stop configured to restrict a motion of the first part of the connection element in relation to the second part of the connection element in a direction of connecting the snap fit joint.

2. The sandwich plate element connection system according to claim 1, wherein the first part and the second part are configured such that the recess holds the edge portion of one of the sandwich plate elements with a press fit.

3. The sandwich plate element connection system according to claim 1, wherein the snap fit joint is formed with a male member on the first or second part of the connection element and a female member on the other one of the first or second part of the connection element.

4. The sandwich plate element connection system according to claim 1, wherein the snap fit joint is elongated in a longitudinal direction of the connection element or is discretely distributed along the longitudinal direction of the connection element.

5. The sandwich plate element connection system according to claim 1, wherein the first and/or second part of the connection element comprises a stop member configured to restrict a motion of the first part of the connection element in relation to the second part of the connection element in a direction of connecting the snap fit joint.

6. The sandwich plate element connection system according to claim 1, wherein the first and/or second part of the connection element comprises a stop element defining a depth of the at least one recess.

7. The sandwich plate element connection according to claim 1, wherein the adhesive is a glue and/or an adhesive tape.

8. The sandwich plate element connection system according to claim 1, wherein the first part and the second part of the connection element form both of said two recesses.

9. The sandwich plate element connection system according to claim 1, wherein the plate core of a sandwich plate element is made from a polymeric foam.

10. The sandwich plate element connection system according to claim 1, wherein the connection element is made of metal.

11. The sandwich plate element connection system according to claim 1, wherein
the at least one first hooking flange comprises two first hooking flanges extending perpendicularly from the first part between two first flanges, and the at least one second hooking flange comprises one second hooking flange formed at a vertex between two second flanges of the second part, where the second hook portions extend from each side of the second hooking flange and respectively engage behind the two first hook portions formed on each of the two first hooking flanges, and wherein the stop is a protrusion extending from the second hooking flange configured to contact a surface of the first part when the sandwich plate element connection is assembled.

12. The sandwich plate element connection system according to claim 1, wherein the at least one first hooking flange comprises only one first hooking flange having only one first hook portion, the only one first hooking flange extending from the first part, and the at least one second hooking flange comprises only one second hooking flange having only one second hook portion, and where the only one first hook portion of the only one first hooking flange engages behind the only one second hook portion of the only one second hooking flange, and wherein the stop is a protrusion extending from the first part configured to contact a surface of the second hooking flange when the sandwich plate element connection is assembled.

13. A method for connecting two sandwich plate elements by means of a connection element, each sandwich plate element comprising a plate core and a first and second plate skin, wherein the first and second plate skin are made from a fibre-reinforced polymer material or from metal, wherein the first plate skin is arranged to at least partly cover a first major surface of the plate core, thereby forming a first major outer surface of the sandwich plate element, and wherein the second plate skin is arranged to at least partially cover a second major surface of the plate core thereby forming a second major outer surface of the sandwich plate element, the connection element defining two recesses, wherein each recess comprises a first and a second inner surface and is configured to hold an edge portion of one of the two sandwich plate elements such that at least a portion of the first major outer surface of the sandwich plate element interacts with the first inner surface of the recess and at least a portion of the second major outer surface of the sandwich plate element interacts with the second inner surface of the recess, wherein the connection element comprising a first part and a second part which are connectable to each other by means of a snap fit joint comprising interlocking features wherein the first part and the second part are locked by mechanical engagement from being separated with respect to each other when the second part is connected to the first part for formation of at least one of said two recesses, in which the first inner surface is arranged on the first part and in which the second inner surface is arranged on the second part, wherein the interlocking feature of the first part is formed by at least one first hooking flange having a first hook portion, the at least one first hooking flange extending from the first part, the interlocking feature of the second part is formed by at least one second hooking flange having a second hook portion, the at least one second hooking flange extending from the second part, wherein the first hook portion of the at least one first hooking flange engages behind the second hook portion of the respective at least one second hooking flange, and wherein the first and/or second part of the connection element comprises a stop configured to restrict a motion of the first part of the connection element in relation to the second part of the connection element in a direction of connecting the snap fit joint;

the method comprising:

applying an adhesive to the first and second inner surfaces arranged on the first and second part and to the portion of the first outer major surface and to the portion of the second outer major surface of the sandwich plate element associated with the at least one of said two recesses, arranging, subsequent to applying the adhesive, the portion of the first outer major surface in contact with the first inner surface arranged on the first part, and connecting the second part to the first part by means of the snap fit joint for formation of the at least one of said two recesses, whereby the portion of the second outer major surface is brought in contact with the second inner surface arranged on the second part, such that the at least one recess, holds the edge portion of the sandwich plate element associated therewith, thereby connecting said two sandwich plate elements, via the connection element, by means of an adhesive joint.

* * * * *